(12) United States Patent
Goddard

(10) Patent No.: US 6,789,934 B1
(45) Date of Patent: Sep. 14, 2004

(54) VACUUM MOLD MAKING AND CASTING EQUIPMENT

(76) Inventor: Don Evan Goddard, 6874 Sharon Ct., Columbus, OH (US) 43229

( * ) Notice: Subject to any disclaimer, the term of this patent is extended or adjusted under 35 U.S.C. 154(b) by 251 days.

(21) Appl. No.: 10/137,263

(22) Filed: May 2, 2002

(51) Int. Cl.[7] .......................... B01F 13/06; B28B 11/00
(52) U.S. Cl. ................. 366/139; 425/445; 425/DIG. 60
(58) Field of Search ................................ 366/242, 255, 366/341, 139; 264/102; 425/445, DIG. 60, 446

(56) References Cited

U.S. PATENT DOCUMENTS

| | | | | |
|---|---|---|---|---|
| 757,895 A | * | 4/1904 | Davis | 99/472 |
| 2,453,914 A | * | 11/1948 | Hollenback | 366/139 |
| 2,536,492 A | * | 1/1951 | Dunn et al. | |
| 2,973,187 A | * | 2/1961 | Wehmer | 366/139 |
| 3,246,674 A | * | 4/1966 | Martin | 141/363 |
| 3,366,369 A | * | 1/1968 | Ravasi | 366/112 |
| 3,608,023 A | * | 9/1971 | Scarborough | 264/102 |
| 3,943,987 A | * | 3/1976 | Rossi | 206/524.8 |
| 3,956,050 A | * | 5/1976 | Dow et al. | 264/102 |
| 4,275,511 A | * | 6/1981 | Parkinson et al. | 34/92 |
| 4,721,390 A | * | 1/1988 | Lidgren | 366/139 |
| 4,984,620 A | * | 1/1991 | Assfalg | 366/139 |
| 5,645,347 A | * | 7/1997 | Draenert | 366/139 |
| 5,865,539 A | * | 2/1999 | Rogers | 366/129 |

* cited by examiner

Primary Examiner—Tony G. Soohoo

(57) ABSTRACT

Vacuum mold making and casting equipment is desirable for producing a higher quality mold when casting small parts in polyurethane resin. Specifically, this equipment is aimed at minimizing entrapped air within such parts by applying suction to create a vacuum. The air could be removed during two steps in the casting process. Initially, air that becomes entrapped in the compound during the mixing phase can be evacuated by sealing the mixing bowl with an airtight lid and applying suction through a hose connected at the top of the lid. After the compound has been poured into the cast, this same equipment can be used to once again remove any entrapped air. By removing entrapped air, higher quality molds and cast materials can be achieved. A supply of disposable mixing cups would be included with the equipment. Although the cups would all feature the same diameter and hemispherical bottom, they would be offered in a variety of capacities and would be marked with volumetric graduations. Thus, the same lid could be used each time a new casting project is undertaken.

3 Claims, 5 Drawing Sheets

BEFORE

AFTER

VACUUM MOLD MAKING AND CASTING EQUIPMENT

BACKGROUND OF THE INVENTION

1. Field of the Invention

The present invention relates to vacuum mold making and casting equipment for use in connection with the production of molds and castings for hobbyists and sculptors. The vacuum mold making and casting equipment has particular utility in connection with providing improved results when casting limited numbers of small parts in polyurethane.

2. Description of the Prior Art

Vacuum mold making and casting equipment is desirable for producing a higher quality mold when casting small parts in polyurethane. Specifically, this equipment is aimed at minimizing entrapped air within such parts by applying suction to create a vacuum. The air could be evacuated at several stages of the process. Air, which is introduced in the mixing process of the molding compound, could be removed by placing an airtight lid on the mixing container and evacuating the air with a suction pump. A hose would run from the suction pump to a seal in the lid. Air that is introduced during the pouring of the polyurethane resin compound could similarly be evacuated by placing the castings in a chamber with an airtight lid and repeating the aforementioned process for air removal. This lid would form the tops and sides of the casting chamber, leaving plenty of room on the base of the chamber for pouring and manipulating the casts.

The use of vacuum creating devices is known in the prior art. For example, U.S. Pat. No. 5,765,608 to Hanns J. Kristen discloses a hand held vacuum device. However, the Kristen '608 patent deals with drawing liquids from food as opposed to air from a molding compound, and it has the further drawback of not providing a container for mixing or casting the compound. Although the Kristen '608 might be adapted for use to remove air from a casting once it is poured, it does not provide a chamber used first for mixing the compound and subsequently for removing the air from this mixture.

U.S. Pat. No. 5,195,427 to Maina Germano discloses a suction device to create a vacuum in containers that is useful in food preservation. However, the Germano '427 patent does not provide for either a mixing or a casting chamber. Furthermore, the Germano '427 device can only be used with containers which have a specific valve suited for this device, such containers being suited for food storage and not shaped for mixing casting compounds, pouring castings, or manipulating castings or molds.

Similarly, U.S. Pat. No. 4,051,971 to Piergiorgio Saleri and Sergio Saleri discloses a home use seal container for food vacuum storage that is used for food storage and preservation. However, the Saleri et al '971 patent does not provide a container that is suitable for mixing a casting compound, and similarly does not provide for a container that is suitable for pouring the castings. The Saleri et al '971 device would require that all work in pouring the casting be done within a cylindrical container, not allowing room for manipulation of the castings.

Additionally, U.S. Pat. No. 6,116,772 to Ellen V. DiGiacomo, James R. DiGiacomo, Christopher R. Johnson, and Rita J. Johnson discloses a disposable bowl and spatula for facilitating the mixing of ingredients in a medical environment. While the DiGiacomo et al '772 device provides a disposable means for mixing compounds, it is not sturdy enough for the mixing of molding compounds and does not provide a base within which to place the bowl for added stability during the mixing process. Furthermore, the DiGiacomo et al '772 device does not provide a means to seal the bowl or evacuate any entrapped air within the contained mixture.

U.S. Pat. No. 5,121,590 to Gregory P. Scanlon discloses a vacuum packing apparatus for evacuating and sealing containers of perishable foods. However, the Scanlon '590 patent does not provide for either a mixing or a casting chamber. Furthermore, the Scanlon '590 device can only be used with containers which have a specific valve suited for this device, such containers being typically cylindrically shaped and suited for food storage and not shaped for mixing casting compounds, pouring castings, or manipulating castings or molds.

Lastly, U.S. Pat. No. Des. 326,663 to Jin S. Kim discloses an ornamental design for a vacuum food container. However, the Kim '663 patent is for a refrigerator/freezer type device, and has the additional deficiency of not being portable or adaptable to different containers. Additionally, the Kim '663 device does not provide a mixing chamber for a casting compound, nor does it provide a chamber for pouring and manipulating the casts.

While the above-described devices fulfill their respective, particular objectives and requirements, the aforementioned patents do not describe vacuum mold making and casting equipment that allows a chamber for mixing the modeling compound and evacuating the trapped air from the mixture as well as a chamber for pouring the casts and evacuating the trapped air a second time. The Kristen '608, Germano '427, Saleri et al '971, Scanlon '590, and Kim '663 patents make no provision for a container which is shaped with a hemispherical bottom and lends itself to mixing casting compounds. Additionally, none these patents provide for a support stand or a mixing spatula for aiding in the mixing process. While the DiGiacomo et al '772 patent provides for both a mixing bowl and a spatula, these devices are too flimsy for use with a denser material such as those used in making molds. Furthermore, the Kristen '608, Germano '427, Saleri et al '971, and Scanlon '590 patents rely on specific containers that are typically cylindrically shaped with the lids fitting on the top of the cylinder. This configuration does not allow room for pouring or manipulating castings. Finally, the Kim '663 patent does not provide for portability of the device.

Therefore, a need exists for new and improved vacuum mold making and casting equipment that can be used to minimize the amount of air trapped within molds and figures cast in polyurethane. In this regard, the present invention substantially fulfills this need. In this respect, the vacuum mold making and casting equipment according to the present invention substantially departs from the conventional concepts and designs of the prior art, and in doing so provides an apparatus primarily developed for the purpose of improving the quality of molds and figures by providing a comprehensive and easy to use set of equipment for mixing and casting resin compounds and eliminating trapped air in the resulting molds and figures.

SUMMARY OF THE INVENTION

In view of the foregoing disadvantages inherent in the known types of vacuum mold making and casting equipment now present in the prior art, the present invention provides an improved set of vacuum mold making and casting equipment, and overcomes the abovementioned disadvantages and drawbacks of the prior art. As such, the general purpose of the present invention, which will be described subsequently in greater detail, is to provide new and improved mold making and casting equipment which has all the advantages of the prior art mentioned heretofore and many novel features that result in mold making and casting equipment which is not anticipated, rendered obvious, suggested, or even implied by the prior art, either alone or in any combination thereof.

To attain this, the present invention essentially comprises a mixing chamber and a casting chamber. The mixing chamber essentially comprises a container, a lid with a gasket along the lower rim which forms an airtight seal with the mixing container, a stand in which the container can be placed, and a suction pump which is connected to the mixing container through flexible tubing attached at a circular seal on the top of the lid. The casting chamber essentially comprises a base upon which the castings can be placed, a lid which forms the top and sides of the chamber, and a connector on top of the lid which can be used to attach the flexible tubing and suction pump to the casting chamber.

There has thus been outlined, rather broadly, the more important features of the invention in order that the detailed description thereof that follows may be better understood and in order that the present contribution to the art may be better appreciated.

The invention may also include a mixing wand shaped to result in a more uniform mixture of the components in the compound. Consideration has also been given to a disposable set of mixing containers with a graduation scale marked on the side. Furthermore, a cylindrical and a rectangular embodiment of the casting chamber will be discussed. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved vacuum mold making and casting equipment that has all of the advantages of the prior art vacuum mold making and casting equipment and none of the disadvantages.

It is another object of the present invention to provide new and improved vacuum mold making and casting equipment that may be easily and efficiently manufactured and marketed.

An even further object of the present invention is to provide new and improved vacuum mold making and casting equipment that has a low cost of manufacture with regard to both materials and labor, and which accordingly is then susceptible of low prices of sale to the consuming public, thereby making such vacuum mold making and casting equipment economically available to the buying public.

Still another object of the present invention is to provide new vacuum mold making and casting equipment that provides in the apparatuses and methods of the prior art some of the advantages thereof, while simultaneously overcoming some of the disadvantages normally associated therewith.

Even still another object of the present invention is to provide vacuum mold making and casting equipment for removing entrapped air when producing castings of such materials as polyurethane. This produces a higher quality casting and reduces the scrappage rate associated with this process.

Yet another object of the present invention is to provide a portable, disposable, and economically feasible mixing chamber for mold making wherein entrapped air can be removed after the molding compound has been mixed.

Still yet another object of the present invention is to provide a portable and economically feasible casting chamber for mold making wherein entrapped air can be removed after the castings have been poured.

Lastly, it is an object of the present invention to provide a new and improved mixing wand for use with the mixing chamber which facilitates the mixing process and results in a more uniform distribution of the components in the molding compound.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
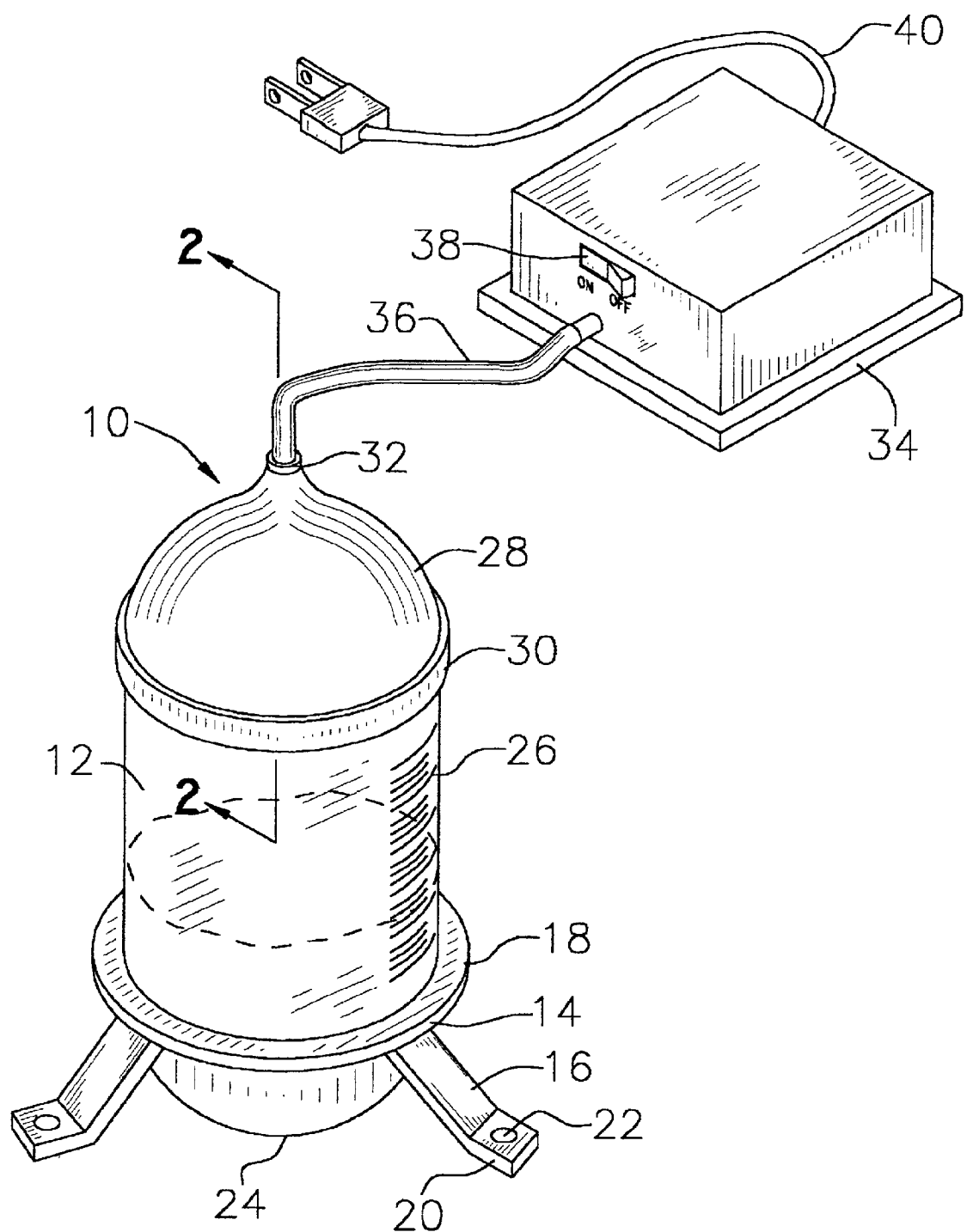
FIG. 1 is a front perspective view of the preferred embodiment of the vacuum mold making and casting equipment constructed in accordance with the principles of the present invention.

Referring now to the drawings, and particularly to FIGS. 1–9, a preferred embodiment of the vacuum mold making and casting equipment of the present invention is shown and generally designated by the reference numeral 10.

In FIG. 1, new and improved vacuum mold and cast equipment 10 of the present invention for mixing and casting resin compounds and eliminating trapped air in the resulting molds and figures is illustrated and will be described. More particularly, the vacuum mold and cast equipment 10 has a mixing container 12 situated on a tripod style stand 14. The stand 14 has three legs 16, one of which can not be seen as depicted in this figure, which are joined to a circular rim 18 in which the mixing container 12 rests. The stand 14 is supported by the feet 20 located at the end of each leg 16 of the stand 14. Each foot 20 has an attachment hole 22 through which the vacuum mold and cast equipment 10 could be secured to a work bench or table for a more permanent set up and greater stability. The mixing container 12 is shaped such that it has mainly a cylindrical shape that is rounded into a bowl shape at the bottom 24. Graduation markings 26 are shown on the mixing container 12 so that it can be used to mix various amounts of compound. A mixing chamber lid 28 is shown attached to the mixing container 12. The mixing chamber lid 28 fits snugly against the mixing container 12 due to the mixing chamber seal 30. This seal would be made of a pliable material such as rubber, so that a tight seal is effected. At the top of the mixing chamber lid 28 is a hose seal 32. Again, this seal would be made of a pliable material such as rubber to ensure a tight seal. The vacuum pump 34 is attached to the mixing chamber lid 28 by a hose 36, made of a rubber or plastic tubing, that is fed through the hose seal 32. The vacuum pump 34 would be similar to an aquarium pump and would be adapted to extract air from the mixing container 12. The vacuum pump would feature an activation switch 38 and an electrical cord 40. A battery pack could be provided as a secondary power source.

Figure 2:
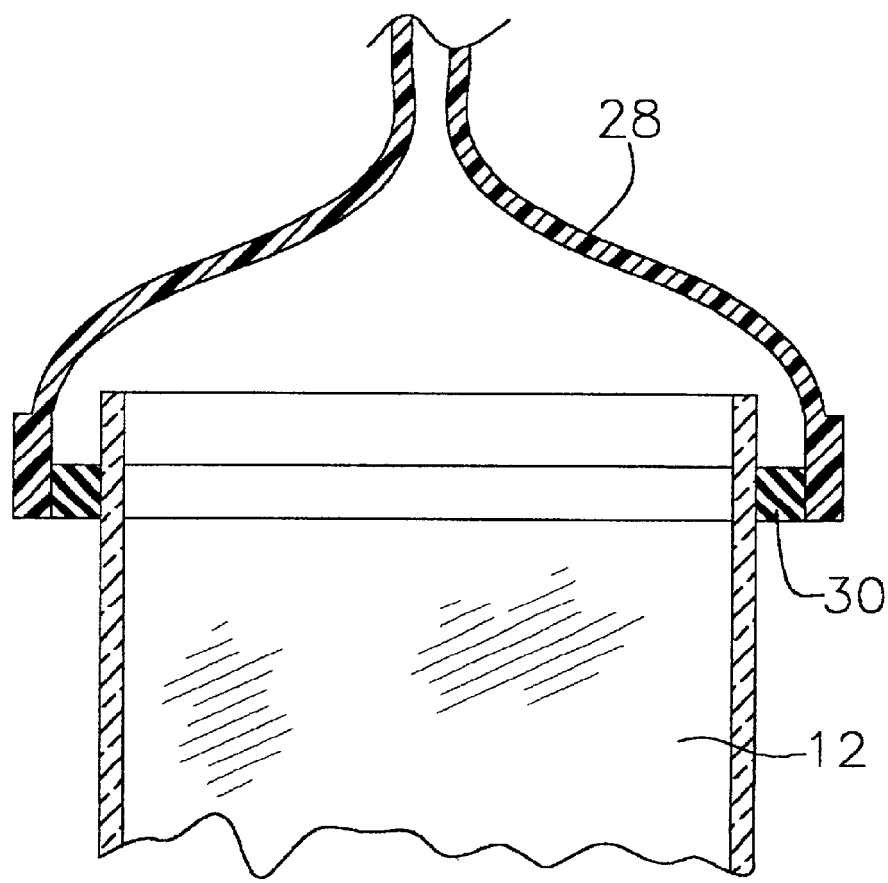
FIG. 2 is a cross-sectional view of the mixing chamber and lid of the present invention.

FIG. 2 is a cross-sectional view of the mixing container 12 and mixing chamber lid 28 of the present invention. The mixing chamber lid 28 is shown to overlap the sides of the mixing container 12, specifically depicting how the mixing chamber seal 30 forms the airtight seal with the mixing container 12.

Figure 3:
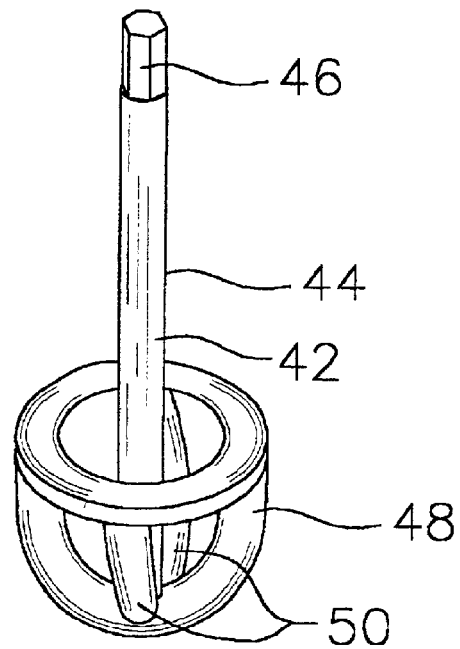
FIG. 3 is a front perspective view of the mixing spatula of the present invention.

FIG. 3 is a front perspective view of the mixing spatula 42 of the present invention. The mixing spatula 42 has a shaft 44 with a hex head 46 at one end and a bowl 48 at the opposite end. The hex head 46 could be used to gain a better grip on the mixing spatula 42 or could possibly be used to connect to some other piece of equipment. The shaft 44 widens at the bottom with two extensions 50 connecting to a cylindrical bowl 48. This unique shape for the mixing spatula 42 would ensure a more uniform mixture of a casting compound.

Figure 4:
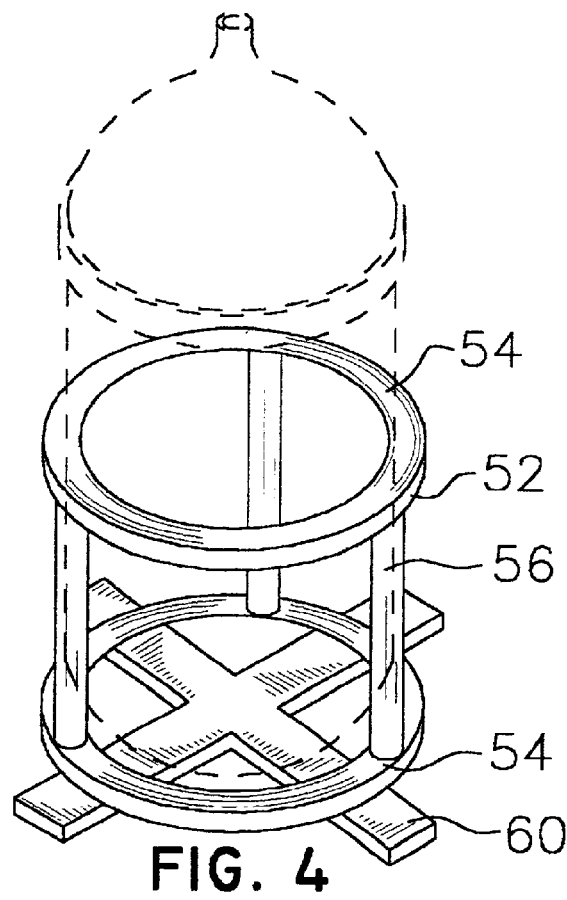
FIG. 4 is a front perspective view of a second embodiment of the mixing stand of the present invention.

FIG. 4 is a front perspective view of a second embodiment of the mixing stand of the present invention. For the purpose of clarity, this second embodiment will be referred to as the flat stand 52. The flat stand 52 consists of two circular horizontal supports 54 which are sized such that the mixing container 12 would rest inside the supports with a minimal clearance between the mixing container 12 and the horizontal supports 54. Three dowel shaped vertical supports 56 join the top and bottom horizontal supports 54. An x-shaped base 60 is attached to the bottom horizontal support 54. The bottom 24 of the mixing container 12 would rest against this base 60.

Figure 5:
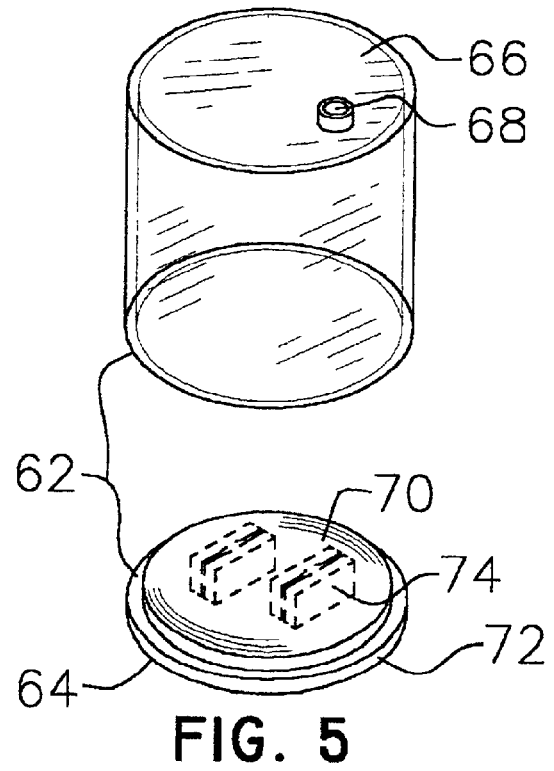
FIG. 5 is a front perspective view of one embodiment of the casting chamber of the present invention.

FIG. 5 is a front perspective view of one embodiment of the casting chamber of the present invention. For the purpose of clarity, this embodiment will be referred to as the cylindrical casting chamber 62. The cylindrical casting chamber 62 consists of a cylindrical cover 66 which would be made of a lightweight, rigid material such as glass, Plexiglas, or plastic. The cylindrical cover 66 is shaped such that it forms the walls of the cylindrical casting chamber 62. A hose connector 68 is located on the top of the cylindrical cover 66 such that the vacuum pump 34 and hose 36 of FIG. 1 can be connected for the purpose of extracting air from the cylindrical casting chamber 62. The remainder of the cylindrical casting chamber 62 is formed by the circular base 64. The circular base 64 consists of a rigid circular base 70 which sits on top of a circular seal 72, which would be made of a pliable material such as rubber to ensure an airtight fit. The castings 74 are situated on top of the rigid circular base 70. When the cylindrical cover 66 is placed over the circular base 64, the circular seal 72 ensures an airtight fit. Air can then be extracted from the castings 74 by inserting the hose 36 into the hose connector 68 and activating the vacuum pump 34.

Figure 6:
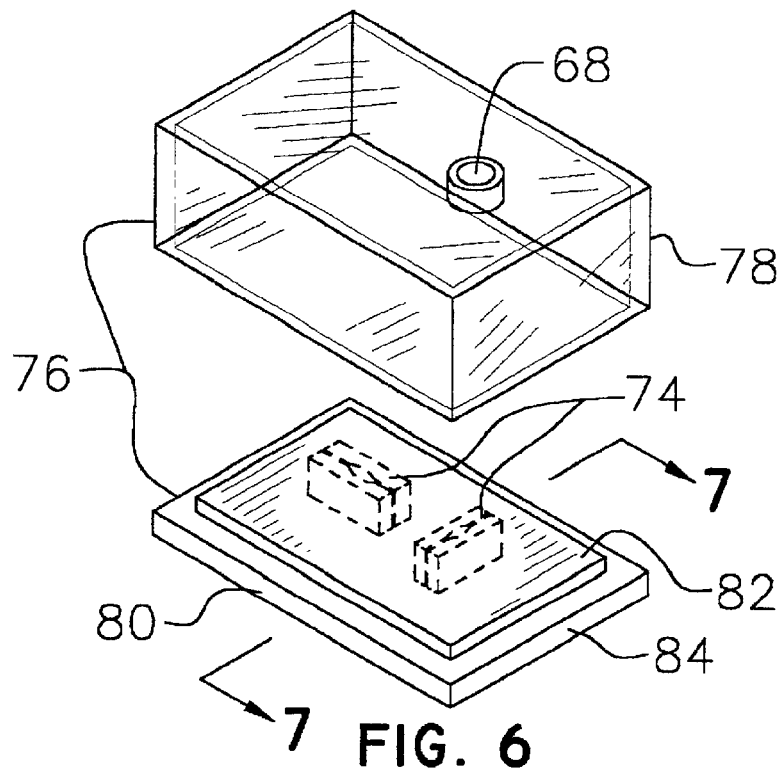
FIG. 6 is a front perspective view of a second embodiment of the casting chamber of the present invention.

FIG. 6 is a front perspective view of a second embodiment of the casting chamber of the present invention. For the purpose of clarity, this embodiment will be referred to as the rectangular casting chamber 76. The rectangular casting chamber 76 consists of a rectangular cover 78 which would be made of a rigid material such as glass, Plexiglas, or plastic. The rectangular cover 78 is shaped such that it forms the walls of the rectangular casting chamber 76. A hose connector 68 is located on the top of the rectangular cover 78 such that the vacuum pump 34 and hose 36 of FIG. 1 can be connected for the purpose of extracting air from the rectangular casting chamber 76. The remainder of the rectangular casting chamber 76 is formed by the rectangular base 80. The rectangular base 80 consists of a rigid rectangular base 82 which sits on top of a rectangular seal 84, which would be made of a pliable material such as rubber to ensure an airtight fit. The castings 74 are situated on top of the rigid rectangular base 82. When the rectangular cover 78 is placed over the rectangular base 80, the rectangular seal 84 ensures an airtight fit. Air can then be extracted from the castings 74 by inserting the hose 36 into the hose connector 68 and activating the vacuum pump 34.

Figure 7:
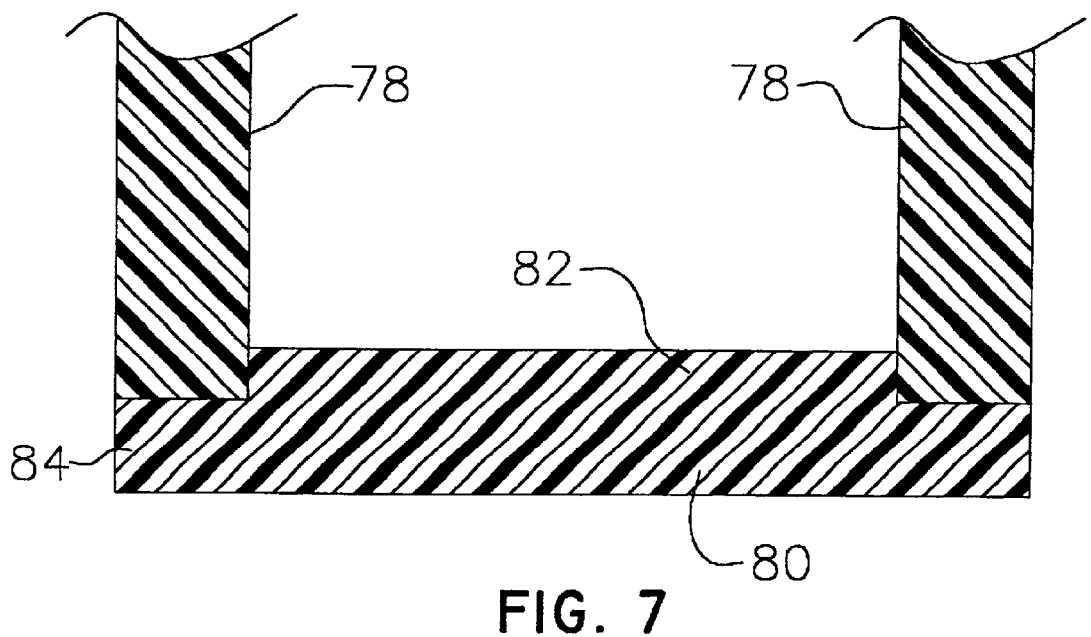
FIG. 7 is a cross-sectional view of the base of the second embodiment of the casting chamber of the present invention.

FIG. 7 is a cross-sectional view of the base of the second embodiment of the rectangular casting chamber 76 of the present invention. This view shows the airtight seal formed between the rectangular cover 78 and the rectangular base 80. The rigid rectangular base 82 fits snugly inside the rectangular cover 78, allowing the rectangular seal 84 to form the airtight union.

Figure 8:
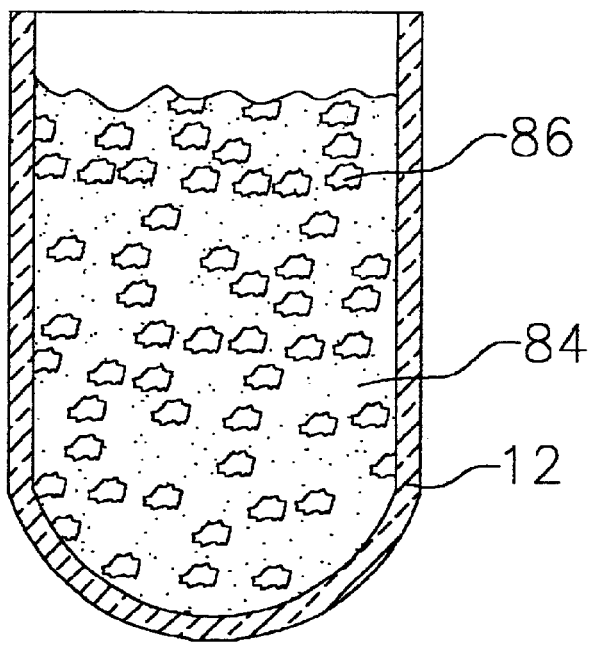
FIG. 8 is a cross-sectional view of a compound in the mixing chamber of the present invention before suction is applied to remove trapped air.
Figure 9:
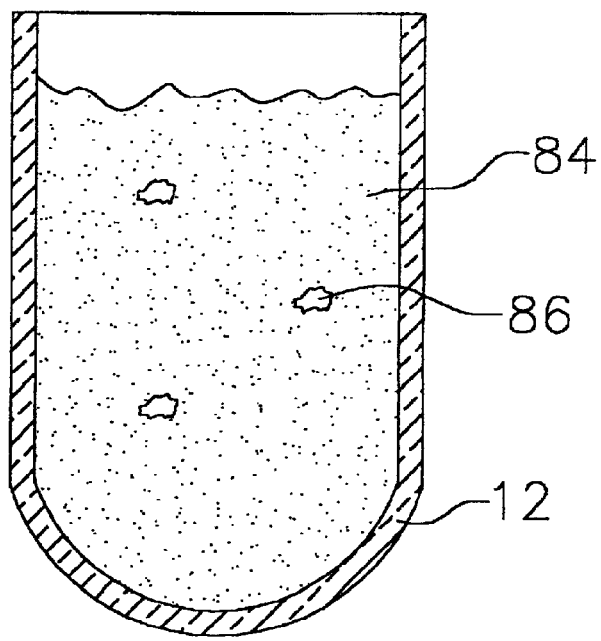
FIG. 9 is a cross-sectional view of a compound in the mixing chamber of the present invention after suction is applied to remove trapped air.

FIG. 8 is a cross-sectional view of a compound in the mixing chamber of the present invention before suction is applied to remove trapped air. The mixing container 12 holds a compound 84 after it has been mixed. A large number of air pockets 86 are shown in the compound. FIG. 9 is a cross-sectional view of the same compound 84 after suction has been applied to remove the trapped air. There are significantly fewer air pockets 86 depicted after the suction has been applied. This portrays the benefit to be gained from using the vacuum mold and cast equipment 10.

In use, it can now be understood that the components for the compound are placed in the mixing container once it has been placed in the stand. The components are stirred with the mixing wand until a uniform consistency is reached. It should be appreciated that the mixing process introduces air bubbles into the mixture. At this time, the lid is attached to the mixing container, and the flexible tubing is attached to both the lid and the suction pump. The suction pump is then activated to evacuate the entrapped air from the compound. The molds are placed on the base of the casting chamber, and the compound is poured into them. The cover is placed over the base, and once again the suction pump is connected to evacuate any air introduced into the castings during the pouring process.

While a preferred embodiment of the vacuum mold making and casting equipment has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, cardboard, or a variety of wood may be used for the rigid portion of the base of the casting chamber. Also, the lid for the mixing chamber and the cover for the casting chamber may be made of any suitable rigid material such as plastic, glass, or Plexiglas. And although the production of polyurethane castings has been described, it should be appreciated that the vacuum mold making and casting equipment herein described is also suitable for other type of castings as well.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chamber for making castings comprising:
    a base having a top layer made of a rigid material for the purpose of supporting castings and formed with an upper surface and a lower surface, a bottom layer made of a pliable, rubbery material and formed with an upper surface and a lower surface, and connected on said upper surface of said bottom layer to said lower surface of said top layer;
    a cover formed of a lightweight, rigid material and having a closed top and an open bottom and shaped to conform to the dimensions of said base wherein an airtight seal is produced when said cover is placed over said base;
    a hose connector attached to said top of said cover;
    a flexible tube having two ends and attached on one end to said hose connector; and
    a suction pump for evacuating air from said chamber and connected to said opposite end of said flexible tube.

2. The chamber for making castings of claim 1 wherein said cover is cylindrical in shape, said base is round in shape, and said cover and said base are of the same diameter, allowing the formation of an airtight seal when said cover is placed over said base.

3. The chamber for making castings of claim 1 wherein said cover is rectangular in shape and said base is formed to the same rectangular shape allowing the formation of an airtight seal when said cover is placed over said base.

* * * * *